United States Patent [19]

Akanabe

[11] Patent Number: 5,532,730
[45] Date of Patent: Jul. 2, 1996

[54] LIGHT BEAM SCANNING APPARATUS

[75] Inventor: Yuichi Akanabe, Hino, Japan

[73] Assignee: Konica Corporation, Japan

[21] Appl. No.: 308,383

[22] Filed: Sep. 19, 1994

[30] Foreign Application Priority Data

Oct. 6, 1993 [JP] Japan ................................ 5-250773

[51] Int. Cl.$^6$ ........................................................ B41J 2/47
[52] U.S. Cl. ............................................. 347/259; 359/216
[58] Field of Search ................................... 347/259, 260, 347/261, 243, 134, 137; 359/212, 215, 216

[56] References Cited

U.S. PATENT DOCUMENTS 5,392,149  2/1995  Boardman et al. ...................... 359/216

*Primary Examiner*—Mark J. Reinhart
*Attorney, Agent, or Firm*—Jordan B. Bierman; Bierman and Muserlian

[57] ABSTRACT

A light beam scanning apparatus for recording an image on a photosensitive material by scanning with an light beam having image information of the image. The apparatus includes a cylinder for holding the photosensitive material, in which the photosensitive material faces an interior of the cylinder; a light source for projecting the light beam; an image rotation optical means for transmitting the light beam projected from the light source; a driver for rotating the image rotation optical means about the central axis, in which the image rotation optical means rotates the light beam projected from the light source at a rotating speed twice the rotating speed of the image rotation optical means; a light beam magnifying means for transmitting the light beam rotated by the image rotation optical means and magnifying the light beam so as to expand a diameter of the light beam; a light beam deflection means for transmitting the light beam magnified by the light beam magnifying means and changing a direction of the light beam so as to direct the light beam onto the photosensitive material; and a driver for rotating the light beam deflection means about the central axis synchronized with a rotation of the light beam so that the image is recorded on the photosensitive material by scanning with the light beam.

5 Claims, 9 Drawing Sheets

LIGHT BEAM SCANNING APPARATUS

BACKGROUND OF THE INVENTION

The present invention relates to a light beam scanning apparatus used in a technical field in which images are recorded when scanning operation is conducted by a light beam such as a laser beam.

As one of this type light beam scanning apparatus, there is provided a internal drum scanning system in which scanning operation is carried out in the following manner: A fixed drum (referred to as a cylinder in this specification) is used. A photosensitive material sheet is attached onto the cylindrical surface. A light beam is circumferentially rotated inside the cylinder so that the photosensitive material sheet on the cylindrical surface can be scanned. In this way, image recording is conducted. This technique is disclosed in Japanese Patent Publication Open to Public Inspection No. 158580/1988.

To go into detail, the primary scanning operation is conducted as follows: A photosensitive material sheet is attached onto the cylindrical surface, and a light beam sent from a light source is incident along a central axis of the cylinder. The light beam is deflected by deflection elements provided in the cylinder such as a reflecting mirror and rectangular prism rotated by a motor around the central axis of the cylinder. Due to the foregoing, the light beam is deflected in a perpendicular direction, and converged by a converging lens disposed in an optical path. In this way, the converged light beam conducts a primary scanning operation on the photosensitive material sheet attached onto the cylindrical surface of the cylinder.

In this case, the motor, light beam deflecting elements and converging lens are moved along the central axis of the cylinder so that the subsidiary scanning operation can be conducted. By the action of the above primary and subsidiary scanning operations, an image is recorded (exposed) on the photosensitive material sheet.

However, in the apparatus described in Japanese Patent Publication Open to Public Inspection No. 158580/1988, only one light beam (a single beam) is used. Therefore, when the light beam deflecting element is rotated by revolution, one primary scanning operation is conducted. Accordingly, an improvement in the recording speed is limited. When a plurality of light beams (multi-beam) are used so as to substantially conduct primary scanning operations by a plurality of times when the light beam deflecting element is rotated by one revolution, it is difficult to scan the plurality of beams in parallel on the scanning surface, that is, it is difficult to conduct scanning using a multi-beam.

A converged beam spot conducts scanning while it is being rotated on the recording surface. Accordingly, when a profile of the spot is elliptic, a direction of the ellipse is changed in accordance with a position of the primary scanning, so that an image of high quality can not be provided. In this case, it is preferable that the beam spot is formed into an ellipse in which a diameter in a direction perpendicular to the primary scanning direction is larger.

In order to solve the above problems, U.S. Pat. No. 5,214,528 discloses the following technique: An image rotation optical element such as a trapezoidal prism by which a beam of light is rotated by one revolution when it is rotated by ½ revolution, is disposed as an image rotation optical means on an incident side of a light beam deflection means (light beam deflection element). When this image rotation optical element is rotated at a speed of ½ of the rotational speed of the light beam deflection element, a beam of light incident on the light beam deflection element is rotated at the same speed as that of the light beam deflection element. In this way, a plurality of beams of light are scanned in parallel on the scanning surface so that each beam can not be rotated.

Japanese Patent Publication Open to Public inspection No. 199021/1992 discloses the following technique: A rectangular prism is used for the image rotation optical element.

Further, U.S. Pat. No. 5,309,274 discloses the following technique: A reflection type element such as a rectangular prism and a cylindrical lens is used for the image rotation optical element, and a beam of light is incident on the image rotation optical element using a beam splitter. Then a reflected beam of light is made to pass through the beam splitter.

However, in the multi-beam scanning in which the image rotation optical means described in U.S. Pat. No. 5,214,528 is used, unless the holding accuracy for holding the image rotation optical means is very high, a position of the primary scanning line recorded in each period (for each revolution of an image) in which the primary scanning is conducted twice is shifted, so that the image quality is deteriorated.

In the multi-beam scanning described in Japanese Patent Publication Open to Public Inspection No. 199021/1992 in which a rectangular prism type image rotation optical element is used, the following problems may be encountered: A beam of light is incident on a portion separate from a rotational axis of the image rotation optical element by a predetermined distance. Accordingly, a beam of light emergent from the image rotation optical element makes a revolution round the rotational axis, wherein a radius of revolution is the aforementioned distance. Therefore, an optical system located after the image rotation optical element requires a large effective diameter.

In the technique disclosed in U.S. Pat. No. 5,309,274, unless the accuracy of the holding mechanism for holding the image rotation optical element is very high, a position of the primary scanning line recorded in each period (for each revolution of an image)in which the primary scanning is conducted twice is shifted, so that the image quality is deteriorated. Further, a beam of light is rotated by the image rotation optical element, so that the direction of polarization is also rotated. Accordingly, in the case where a beam splitter is used, due to the polarization characteristics of the beam splitter, power of a beam of light fluctuates after it has passed through the beam splitter twice.

SUMMARY OF THE INVENTION

The present invention has been achieved in view of the above circumstances. It is an object of the present invention to suppress the occurrence of an uneven pitch of the primary scanning caused by a low holding accuracy of the image rotation optical means, wherein a period of the uneven pitch of the primary scanning is the same as a period in which the primary scanning is conducted twice.

It is another object of the present invention to compensate the fluctuation of power caused when a beam of light passes through the beam splitter after the beam of light has passed through the image rotation optical means in the case where a reflection type image rotation optical means and the beam splitter are used.

In order to accomplish the above objects, the present invention is to provide a light beam scanning apparatus comprising:

a plurality of light sources for emitting light beams from adjacent points on the same plane;

a modulation means for independently modulating the plurality of light sources;

a light beam collimating means for collimating the plurality of light beams emitted from the plurality of light sources so that the plurality of light beams are made to be approximately collimated;

an image rotation optical means disposed in an optical path after the light beam collimating means, the image rotation optical means rotating a light beam by one revolution when the image rotation optical means is rotated by ½ revolution around a straight line coinciding with a central axis of the optical path;

an optical beam expanding means disposed in an optical path after the image rotation optical means, the optical beam expanding means making a light beam collimated by the light beam collimating means to be a collimated beam of which the beam diameter is expanded;

an optical beam deflecting means disposed in an optical path after the optical beam expanding means, the optical beam deflecting means deflecting a light beam in a direction crossing with a straight line approximately coinciding with a central axis of the optical path, further the optical beam deflecting means rotating around the straight line;

a light beam converging means disposed in an optical path after the optical beam extending means, the light beam converging means converging a light beam;

a cylindrical member, the central axis of which is a straight line approximately coinciding with a rotational axis of the light beam deflecting means, the cylindrical member holding a photosensitive material sheet on a cylindrical surface on which a light beam converges by the light beam converging means; and a relatively moving means for relatively moving at least the optical beam deflecting means, the light beam converging means and the cylindrical member in a direction of the central axis of the cylindrical member, wherein the image rotation optical means rotates at a speed of ½ of the rotational speed of the light beam deflecting means.

In this case, the following construction may be adopted: The image rotation optical means is of a reflection type. A beam splitter is disposed in an optical path between the image rotation optical means and the light beam extending means. A portion of the light beam collimated by the light beam collimating means is incident on the reflection type image rotation optical means by the beam splitter. After the reflection, the light beam is incident on the beam splitter, and a portion of the light beam is incident on the light beam expanding means.

In the case where the reflection type image rotation optical means and the beam splitter are used, a polarization compensating means may be provided in an optical path after the image rotation optical means, wherein the polarization compensating means has a characteristic by which a difference of dividing characteristics between P-polarization and S-polarization of the beam splitter can be canceled.

A phase relation between the image rotation optical means and the light beam deflection means may be established in the following manner: When the light beam deflecting means deflects a light beam to an approximately central portion of an effective scanning region, a deviation of the image rotation optical means becomes parallel with the primary scanning direction of the light beam. When the light beam deflection means deflects a light beam to an approximately central portion of an ineffective scanning region, a deviation of the image rotation optical means is perpendicular to the primary scanning direction of the light beam.

The following means may be provided, by which all the light beams from the plural light sources are turned off so as to stop recording with the light beams while the light beam deflecting means rotates one revolution for each two revolutions.

In the above construction, when the image rotation optical means is rotated at a rotational speed of ½ of that of the light beam deflecting means, a light beam incident on the light beam deflecting means is rotated at the same speed as that of the light beam deflecting means. As a result of the foregoing, due to the rotation of the light beam deflecting means, a plurality of light beams circumferentially conducting scanning on a photosensitive material sheet held on the cylindrical member become parallel, and the primary scanning is conducted while each light beam is not rotated.

By the relatively moving means, for example, the light beam deflecting means and the light beam converging means are moved to the central axis of the cylindrical member, so that the subsidiary scanning is conducted. Due to the foregoing, an image is recorded (exposed) on the photosensitive material sheet held by the cylindrical member.

In this case, by the action of the light beam expanding means, the fluctuation of the light beam caused by the image rotation optical means is reduced, because the fluctuation in the light beam direction is reduced in inverse proportion to the expansion of the light beam diameter.

The fundamental configuration of the light beam expanding means is based on the layout of the lenses $5a$ and $5b$, which are respectively having the focal length of f1 and f2 (f2>f1), so that the lenses share the common focal plane. As the collimated light beam is incident from the side of the lens $5a$, the light beam, projected from the lens $5b$, becomes the one which is collimated to have the beam diameter f1/f2 times (<1) of the incident light beam. This effect is well known in the art of geometrical optics.

It is also well known that when the direction of incident beam varies, the direction of outgoing beam is controlled in inverse proportion to the magnification {f1/f2 (<1)}. It is common to use three or more lenses to configure the expanding means; the based method is the same as the above.

By the action of the light beam expanding means, a light beam diameter at the position of the image rotation optical means can be made smaller than the light beam diameter required at the positions of the light beam deflecting means and the light beam converging means, that is, a light beam of which the effective diameter is small can be used, so that the image rotation optical means of a small size can be applied. When the size of the image rotation optical means is reduced, the rotational speed can be easily increased, and further the rotation can be stabilized.

When a beam splitter is used, a reflection type image rotation optical means can be applied.

When the beam splitter is used, power of the light beam that has passed through the beam splitter for the second time fluctuates due to the polarizing characteristics of the beam splitter. This problem can be solved when a polarizing compensation means is used.

When a phase relation between the image rotation optical means and the light beam deflecting means is established in accordance with a relation between the effective and ineffective scanning regions, the image quality is less affected by the fluctuation in the primary scanning direction than by the fluctuation in the subsidiary scanning direction. Utilizing the foregoing, the deterioration of image quality caused by the fluctuation of the light beam made by the fluctuation of the image rotation optical means can be reduced. Therefore, an influence of the fluctuation caused in each two revolutions of the light beam due to insufficient holding accuracy of the image rotation optical means can be reduced.

Recording with the light beams is stopped while the light beam deflecting means rotates one revolution for each two revolutions. Therefore, the image recording speed is reduced to ½, however, the fluctuation of a light beam caused by the holding accuracy of the image rotation optical means is reduced, so that high image quality can be provided.

DETAILED DESCRIPTION OF THE INVENTION

An example of the present invention will be explained below.

Figure 1:
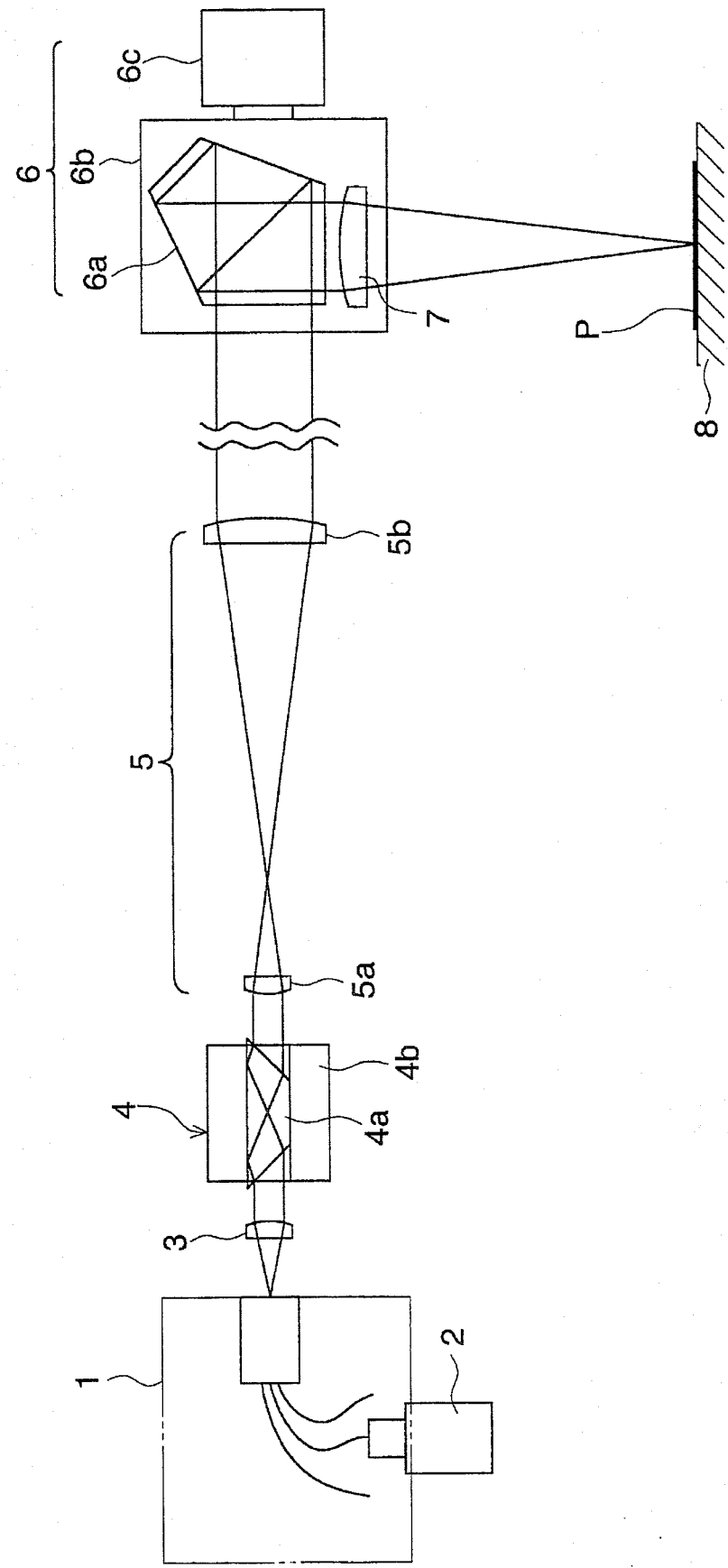
FIG. 1 is a schematic illustration showing the first example of the present invention.

FIG. 1 is a view showing the first example of the present invention.

A light beam scanning apparatus of this example includes a plurality of light sources 1, modulation means 2, light beam collimating means 3, image rotation optical means 4, light beam expanding means 5, light beam deflection means 6, light beam converging means 7, cylindrical member 8, and relatively moving means (not shown in the drawing).

The plurality of light sources 1 are constructed in such a manner that light beams are emitted from the points close to each other located on the approximately same surface. For example, light beams emitted from the individual light sources (lasers or light emitting diodes) are converged onto the approximately same surface by an optical system, and the converged light beams on the same surface are used as a light source. Alternatively, a device in which the individual light sources are connected with the emergent ends of optical fibers (fiber array) arranged close to each other is used for the light source. Alternatively, when laser diodes or light emitting diodes are integrated on a semiconductor base plate, it is used for the light source, and especially a surface light emitting laser array is used.

The modulation means 2 independently modulates each of the plurality of light sources 1. In the case of a semiconductor laser (LD), when a current applied to the LD is modulated, a direct modulation, that the plurality of light sources can be modulated, is commonly used; and a circuit to convert a received image signal into a current applied to the LD is used for the modulation means 2. In the case of a gas laser, an external modulator such as an acousto-optic modulator is commonly used.

A plurality of light beams emitted from the plurality of light sources 1 are made to be approximately collimated beams by the light beam collimating means 3. An optical system having positive power such as a convex lens is used for the light beam parallelizing means 3. The image rotation optical means 4 is disposed in an optical path after the light beam collimating means 3. The image rotation optical means 4 is rotated round a straight line approximately coinciding with the central axis of the optical path. When the image rotation optical means 4 is rotated by ½ revolution, the light beam is rotated by one revolution. In this example, a trapezoidal prism is used for the image rotation optical element 4a. This image rotation optical element 4a is held by a cylindrical holder 4b and rotated by a motor not shown in the drawing.

Figure 2:
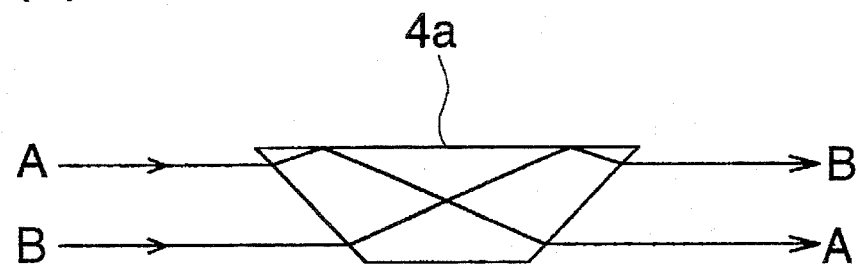
FIGS. 2(a) and 2(b) are views showing the function of the image rotation optical means shown in FIG. 1.
Figure 2:
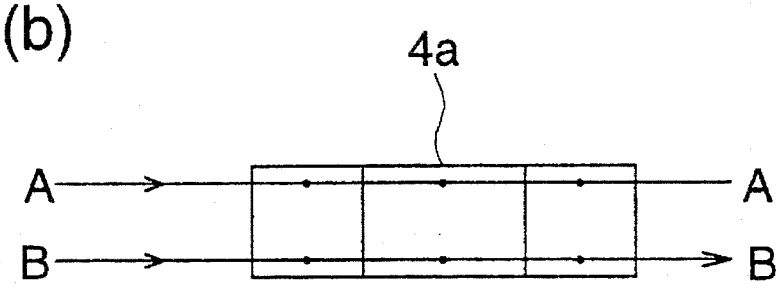

As illustrated in FIGS. 2(a) and 2(b), two light beams A and B are incident on the trapezoidal prism 4a which is an image rotation optical element. When the trapezoidal prism 4a is rotated by 90° from a condition shown in FIG. 2(a) to a condition shown in FIG. 2(b), the light beams A and B emergent from the trapezoidal prism 4a are rotated by 180°. Due to the foregoing, it can be understood that the light beam is rotated by one revolution when the trapezoidal prism 4a is rotated by ½ revolution.

Not only the trapezoidal prism but also the following components can be used for the image rotation optical element 4a: a Pechan prism; a combination of mirrors; a cylindrical lens and its combination as proposed in Japanese Patent Application No. 43662/1992; a rectangular prism; and a combination of a cylindrical lens and a mirror or a prism.

The light beam expanding means 5 is disposed in an optical path after the image rotation optical means 4. The light beam collimated by the light beam collimating means 3 is expanded to a collimated beam in which the beam diameter is expanded. Specifically, the diameter of the incident collimated beam is expanded by the action of a combination of a plurality of lenses, so that a collimated light beam can be emitted from the light beam expanding means 5. A typical example is shown in this example, in which a convex or concave lens 5a of which the focal distance is short is disposed on the incident side, and a convex lens 5b of which the focal distance is long is disposed on the emergent side.

The light beam deflection means 6 is disposed in an optical path after the light beam expanding means 5. The light beam deflection means 6 deflects a light beam in a direction crossing with a straight line coinciding with the central axis of the optical path, and in general, the light beam deflection means 6 deflects a light beam in a direction perpendicular to a straight line coinciding with the central axis of the optical path, and at the same time, the light beam deflection means 6 is rotated round the straight line. In this example, a pentagonal prism is used for the light beam deflection element 6a, and this pentagonal prism is held by a holder 6b and rotated by a motor 6c. By the rotation of this light beam deflection element 6a, the light beam conducts the primary scanning in the circumferential direction. Not only the pentagonal prism but also the following components are used for the light beam deflection element 6a: a rectangular prism, a mirror, or a combination of mirrors.

The light beam converging means 7 is disposed in an optical path after the light beam expanding means 5, and converges the light beam. An optical system (converging lens) having a positive power such as a convex lens is used for the light beam converging means 7. In this example, the light beam converging means 7 is disposed in an optical path after the light beam deflection means 6 (light beam deflection element 6a), and held by the holder 6b of the light beam deflection element 6a, so that the light beam converging means 7 is rotated integrally with the light beam deflection element 6a. However, the light beam converging means 7 may be disposed in an optical path before the light beam deflection means 6. In this case, it is not necessary to rotate the light beam converging means 7.

The cylindrical member 8 holds a photosensitive material sheet P on the cylindrical surface, the central axis of which is a straight line approximately coinciding with the rotational axis of the light beam deflecting means 6, and a light beam is converged on the cylindrical surface by the light beam converging means 7. Specifically, the photosensitive material sheet P is held on an inner surface of the cylindrical member 8, or alternatively the photosensitive material sheet P is held on an outer surface of the transparent cylindrical member 8. Alternatively, a groove or a cutout portion is provided in a portion on the cylindrical surface, and the photosensitive material sheet P is held by this portion while the photosensitive material sheet P is set along the cylindrical surface.

In order to conduct the subsidiary scanning, the relatively moving means (not shown in the drawing) relatively moves at least the light beam deflection means 6 and the light beam converging means 7 and also the cylindrical member 8 to the central axis of the cylindrical member 8. Specifically, the entire optical system including the light beam deflection means 6 and the light beam converging means 7 is fixed, and the cylindrical member 8 is moved. Alternatively, the cylindrical member 8 is fixed, and the entire optical system is moved. Alternatively, only the light beam deflection means 6 and the light beam converging means 7 are moved, and other optical system components and the cylindrical member 8 are fixed. A motor and feed screw are used for the movement.

Next, the mode of operation will be explained as follows.

The image rotation optical means 4 rotates a light beam at a speed of ½ of the rotational speed of the light beam deflection means 6.

Due to the foregoing, a light beam incident upon the light beam deflection means 6 is rotated at the same speed as that of the light beam deflection means 6. As a result, by the rotation of the light beam deflection means 6, a plurality of light beams are scanned mutually in parallel which conduct scanning in a circumferential direction on the photosensitive material sheet P held by the cylindrical member 8. Then the primary scanning is conducted while each of the plurality of light beams is not rotated.

For example, the light beam deflection means 6 and the light beam converging means 7 are moved to the central axis of the cylindrical member 8 by the relatively moving means (not shown in the drawing), so that the subsidiary scanning is conducted. Due to the foregoing, an image is recorded (exposed) on the photosensitive material sheet P held by the cylindrical member 8.

By the action of the light beam expanding means 5, the fluctuation of the light beam caused by the image rotation optical means 4 (image rotation optical element 4a) can be reduced. The reason is that the fluctuation in the light beam direction is reduced in inverse proportion to the expansion of the light beam diameter, by the expansion of the light beam.

By the action of the light beam expanding means 5, a beam diameter at the position of the image rotation optical means 4 can be reduced smaller than the necessary beam diameter at the position of the light beam deflection means 6 or the light beam converging mean 7. Therefore, it is possible to use a light beam of which the effective diameter is small. Accordingly, the dimensions of the image rotation optical means 4 can be reduced.

Figure 3:
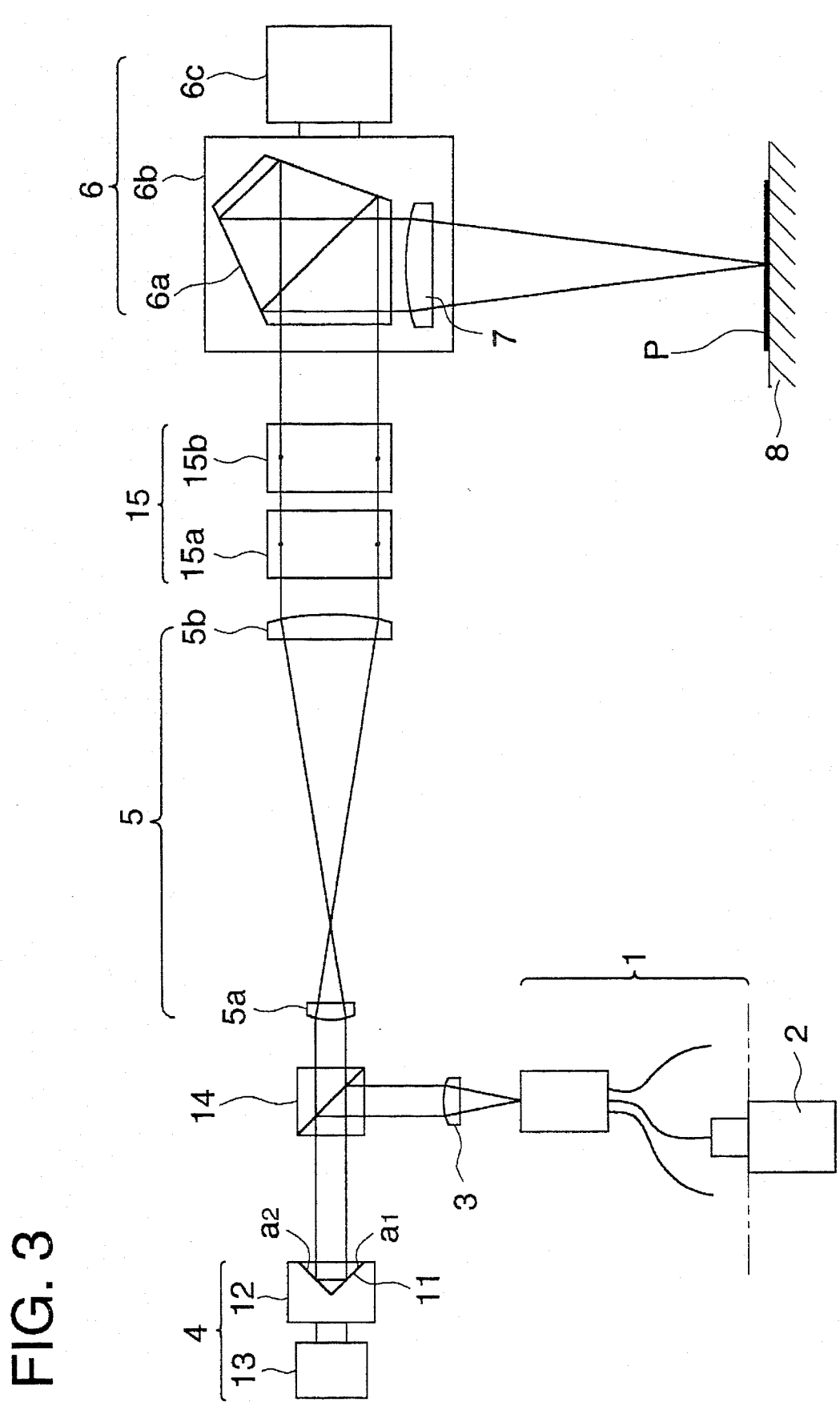
FIG. 3 is a schematic illustration showing the second example of the present invention.

FIG. 3 is a view showing the second example of the present invention.

The second example will be explained as follows. Like parts in each of FIGS. 1 and 3 are identified by the same reference character, and the explanations are omitted here. Only different components will be described below.

A reflection type image rotation optical means is used for the image rotation optical means 4. A rectangular prism having plane reflecting surfaces a1, a2 which meet at right angles with each other is used for the image rotation optical element 11. A ridge on which the reflecting surfaces $a_1$, $a_2$ cross with each other meets at right angles with an optical axis on the incident side of the light beam expanding means 5. The reflecting surfaces $a_1$, $a_2$ respectively form an angle of about 45° with respect to the optical axis on the incident side of the light beam expanding means 5.

This rectangular prism, which is the image rotation optical element 11, is held by a holder 11 and rotated by a motor 13 at a rotational speed of ½ of that of the light beam deflection means 6 round a straight line coinciding with the optical axis on the incident side of the light beam expanding means 5. In this case, not only the rectangular prism but also a reflection mirror and others can be used for the image rotation optical element 11.

A beam splitter 14 is disposed in an optical path between the image rotation optical means 4 and the light beam expanding means 5. A plurality of light beams which are emitted from a plurality of light sources 1 and made to be parallel by the light beam collimating means 3 are incident on the beam splitter 14 in a direction perpendicular to the optical path between the image rotation optical means 4 and the light beam expanding means 5.

Due to the foregoing, a portion of the light beam parallelized by the light beam collimating means 3 is incident on the reflection type image rotation optical means 4 by the beam splitter. After the light beam has been reflected, it is incident on the beam splitter 14, and a portion of the light beam is incident on the light beam expanding means 5.

Figure 4:
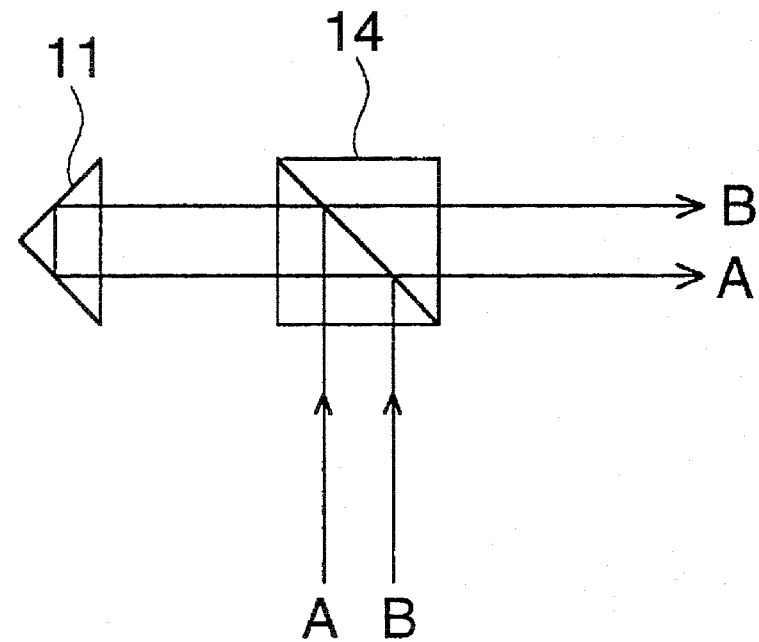
FIGS. 4(a) and 4(b) are views showing the function of the image rotation optical means shown in FIG. 3.
Figure 4:
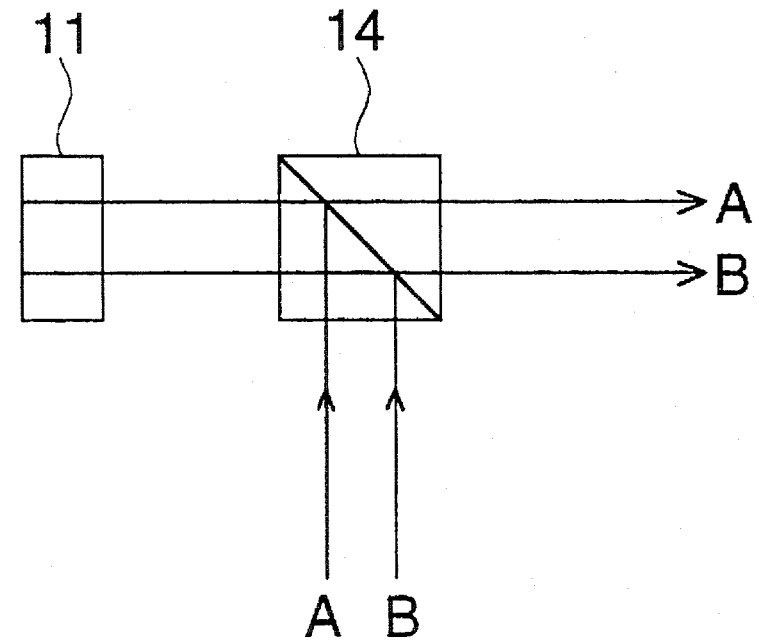

As shown in FIGS. 4(a) and 4(b), an investigation is made into a case in which two light beams A and B are incident on the rectangular prism 11 which is an image rotation optical element. The rectangular prism 11 is rotated by 90° from a position shown in FIG. 4(a) to a position shown in FIG. 4(b). Then the light beams A and B emergent from the rectangular prism 11 are rotated by 180°. From the foregoing, it can be understood that the light beam is rotated by one revolution when the rectangular prism 11 is rotated by ½ revolution.

When the beam splitter 14 is provided, power loss is caused. However, the beam splitter 14 is provided for the following reason. In the case of the reflection type image rotation optical element 11, a light beam incident on the reflection type image rotation optical element 11 and a light beam emergent from it are located close to each other. In order to separate them, the beam splitter 14 is provided.

In an optical path after the image rotation optical means 4, in this example, in an optical path after the optical beam expanding means 5, there is provided a polarizing compensation means 15 having characteristics in which a difference of splitting characteristics between P-polarization and S-polarization of the beam splitter 14 is canceled.

Concerning the polarization compensation means 15, it is preferable that an even number of parallel plane plates 15a, 15b are disposed respectively inclined with respect to the optical path, because the dislocation of the optical shaft can be canceled. The incident plane is disposed in such a manner that it is parallel with or perpendicular to the incident plane of the beam splitter 14.

In this example, by the action of the beam splitter 14, the reflection type image rotation optical element 11 can be used. Therefore, restrictions imposed on the design and manufacture of the motor 13 are reduced. In other words, it is not necessary to provide a motor, the spindle of which is cylindrical and the image rotation optical element can be held in the rotational axis.

In the case where the reflection type image rotation optical element is used without providing a beam splitter, it is necessary that the incident light beam is incident on a position separate from a rotational center of the motor so that the incident light beam can be separated from the emergent light beam. In this case, the emergent light beam is rotated round a rotational axis of the motor along a circumference including the incident light beam. Consequently, it becomes necessary to use an optical system, the effective diameter of which is large, for the light beam extending means and after that.

In this example, the polarization characteristics of the beam splitter 14 are compensated by the actions of the parallel plane plates 15a, 15b which are the polarization compensating means 15.

Figure 5:
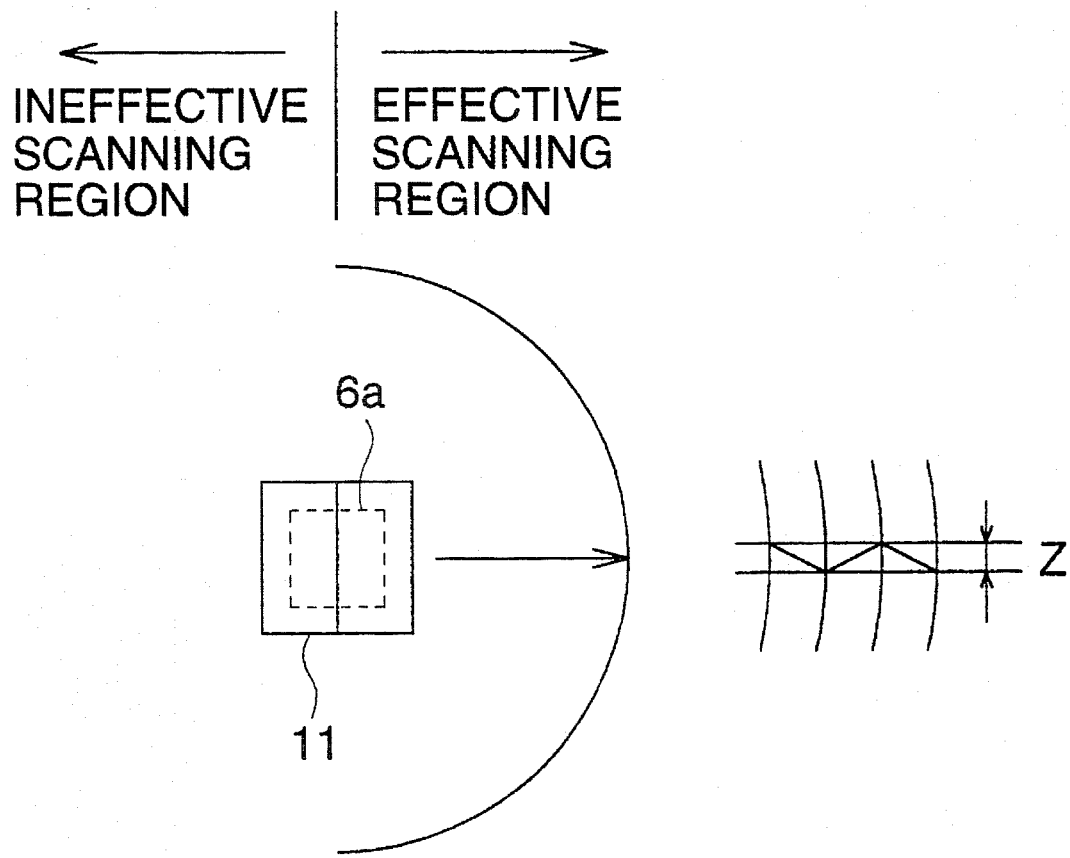
FIGS. 5(a) and 5(b) are views showing a phase relation in the effective scanning region.
Figure 5:
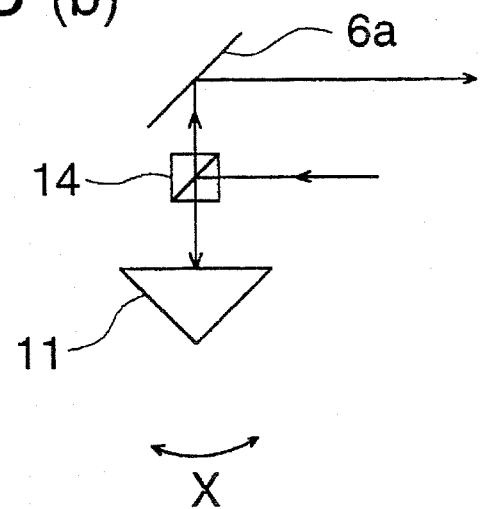
Figure 6:
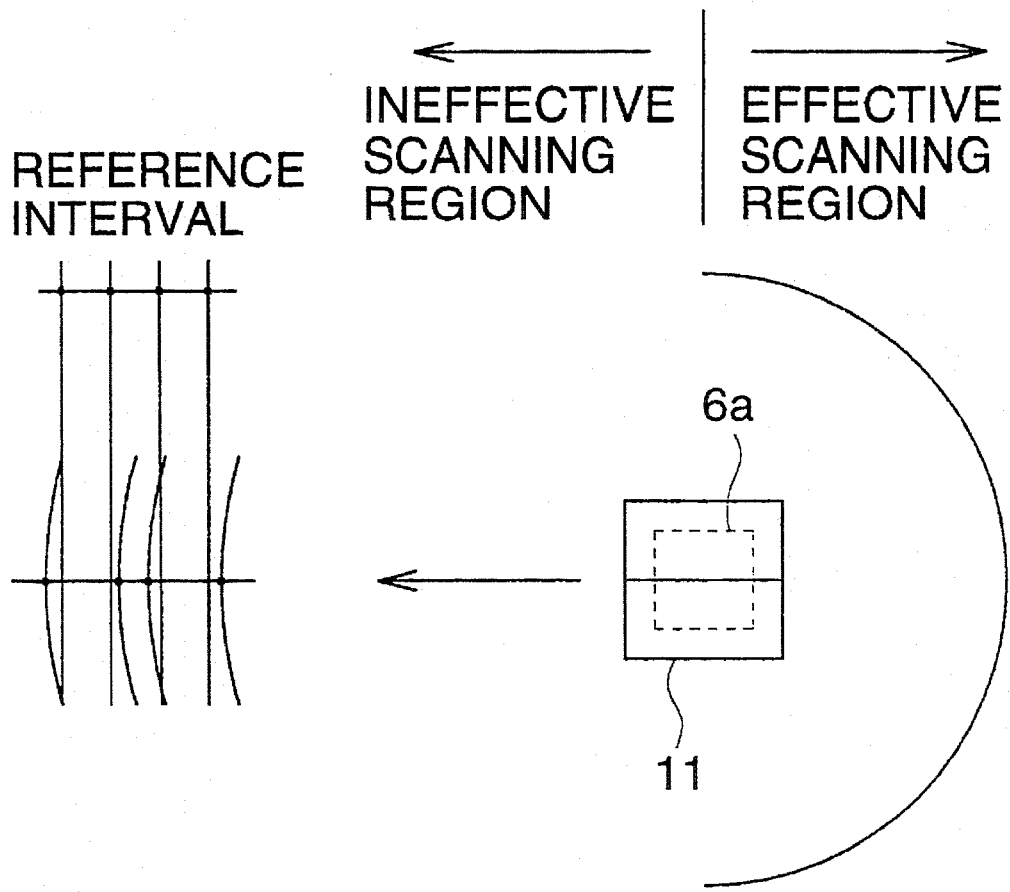
FIGS. 6(a) and 6(b) are views showing a phase relation in the ineffective scanning region.
Figure 6:
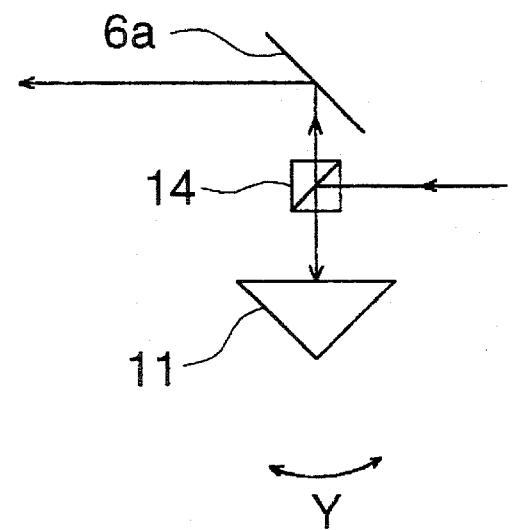

With reference to FIGS. 5 and 6, a phase relation between the image rotation optical means 4 and the light beam deflection means 6 in the first and second examples (shown in FIGS. 1 and 3) will be explained as follows.

In this case, it is preferable that a phase relation between the image rotation optical means 4 (the image rotation optical elements 4a, 11) and the light beam deflection means 6 (the light beam deflection element 6a) is established in the following manner: When the light beam deflecting means 6 (the light beam deflecting element 6a) deflects a light beam approximately at the center of the effective scanning region, the deviation of the image rotation optical means 4 (the image rotation optical elements 4a, 11) becomes parallel with the primary scanning direction of the light beam. When the light beam deflection means 6 (the light beam deflection element 6a) deflects a light beam approximately at the center of the ineffective scanning region, the deviation of the image rotation optical means 4 (the image rotation optical elements 4a, 11) becomes perpendicular to the primary scanning direction of the light beam.

Specifically, as shown in FIGS. 5(a) and 5(b), when the image rotation optical element 11 is a rectangular prism, a ridge of the rectangular prism 11 is set to be approximately perpendicular to the deflected light beam so that the light beam deflecting element 6a can deflect the light beam approximately to the center of the effective scanning region. In FIG. 5(b), the deviation of the rectangular prism 11 in the direction of arrow X does not affect the reflection of the light beam. The deviation perpendicular to the surface of FIG. 5(b) becomes a deviation Z in the primary scanning direction in FIG. 5(a).

As illustrated in FIGS. 6(a) and 6(b), when the light beam deflection element 6a approximately deflects a light beam to the center of the ineffective region, the ridges of the rectangular prism 11 are made to be approximately parallel with the deflected light beam. In FIG. 6(b), a dislocation of the rectangular prism 11 in the direction of arrow Y is the same as that in the direction perpendicular to the primary scanning direction in FIG. 6(a), that is, a dislocation of the rectangular prism 11 in the direction of arrow Y is the same as the dislocation with respect to a reference interval. A dislocation perpendicular to the surface of FIG. 6(b) does not affect a direction of the light beam.

Due to a phase relation between the image rotation optical element (rectangular prism) 11 and the light beam deflecting element 6a, and also due to a relation between the effective and ineffective scanning regions, an influence exerted by the dislocation caused by the insufficient holding accuracy of the image rotation optical element 11 can be reduced, wherein the dislocation is caused for each two revolutions of the beam.

That is, at the center of the effective scanning region, the dislocation of the light beam is generated in the primary scanning direction, and at the center of the ineffective region, the dislocation of the light beam is generated in the subsidiary scanning direction. At the edge of the effective scanning region, a dislocation is distributed to the primary and subsidiary scanning directions. The dislocation in the primary scanning direction less affects the image quality than the dislocation in the subsidiary direction. Therefore, by the arrangement described above, the dislocation of the light beam caused by the dislocation of the image rotation optical element 11 less affects the image quality.

In this connection, in the case where the image rotation optical element is a trapezoidal prism (4a), the phase relation is established in the following manner: When the light beam deflecting element approximately deflects a light beam to the center of the effective scanning region, an incident surface of the trapezoidal prism is set in a direction approximately perpendicular to the deflected light beam. When the light beam deflecting element approximately deflects the light beam to the center of the ineffective scanning region, the incident surface of the trapezoidal prism is set in a direction approximately parallel to the deflected light beam.

In the first example (shown in FIG. 1) or in the second example (shown in FIG. 3), it is preferable that the following means is provided: Emission of all light beams from a plurality of light beams 1 is stopped for one revolution at each two revolutions of the light beam deflecting means 6, so that the recording conducted by the light beam is stopped. Also, it is preferable to provide a means by which the subsidiary scanning speed is reduced to ½ when the recording is stopped.

When the emission of the light beam is stopped for one revolution at each two revolutions of the light beam deflecting means 6, the image recording speed is reduced to ½, however, a dislocation of the light beam caused by the insufficient holding accuracy of the image rotation optical means 4 can be reduced, so that excellent image quality can be ensured.

In the case where high image quality is required, or in the case where the holding accuracy of the image rotation optical means 4 is lowered and image quality is deteriorated, it is possible to maintain the image quality when the mode is changed into a mode in which the light beam emission is stopped for one revolution at each two revolutions. In this case, it is clear that the subsidiary scanning speed may be reduced to ½ compared with the normal speed.

Next, with reference to FIG. 7, a construction will be explained in which the rectangular prism 11 is highly accurately attached with respect to a rotational axis of the motor 13 in the case where the rectangular prism is used for the image rotation optical element 6 (image rotation optical element 11).

Figure 7:
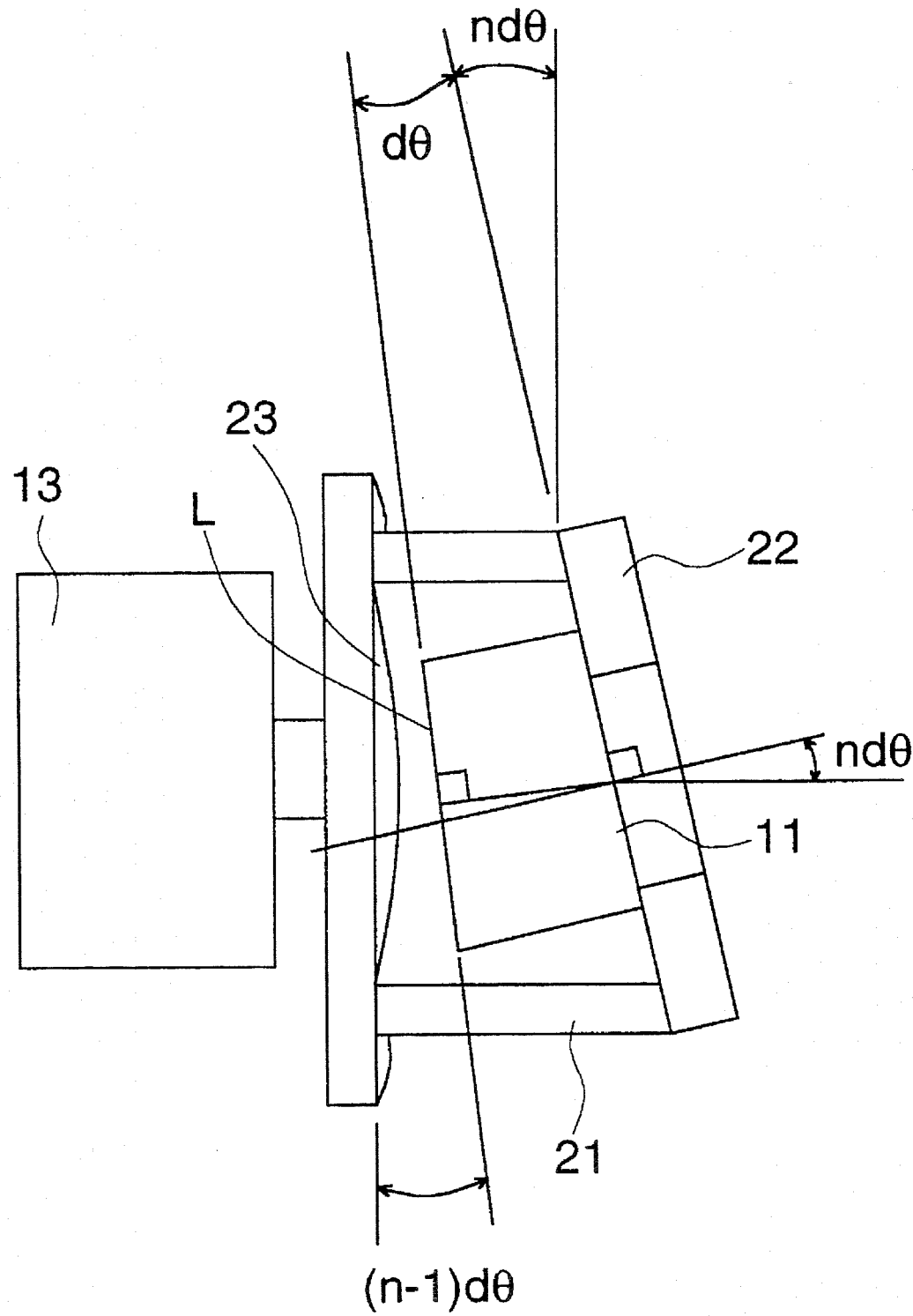
FIG. 7 is a view showing the holding construction of the image rotation optical means.

The image rotation optical means shown in FIG. 7 includes a motor 13 and a rotational rectangular prism 11 held by the motor 13. A ridge (L) of the apex angle of the rectangular prism 11 meets at right angles with the rotational axis of the motor 13. A surface of the rectangular prism 11 opposed to the ridge is held in such a manner that the surface meets at approximately right angles with the rotational axis of the motor 13 and also the surface is held on a distant side with respect to the motor 13.

In this case, the essential construction will be described as follows: The error in parallelism between the ridge of the rectangular prism 11 and a surface opposed to the ridge is defined as $d\theta$. The refractive index of the rectangular prism 11 is defined as n. The rectangular prism 11 is held so that the ridge of the rectangular prism 11 can be inclined by an angle of $(n-1)d\theta$ with respect to a straight line perpendicular to the rotational axis of the motor 13 and so that a straight line on which a surface including the ridge and the rotational axis of the motor 13, crosses with the opposed surface, can be inclined by an angle of $nd\theta$ with respect to a straight line perpendicular to the rotational axis of the motor 13.

Figure 8:
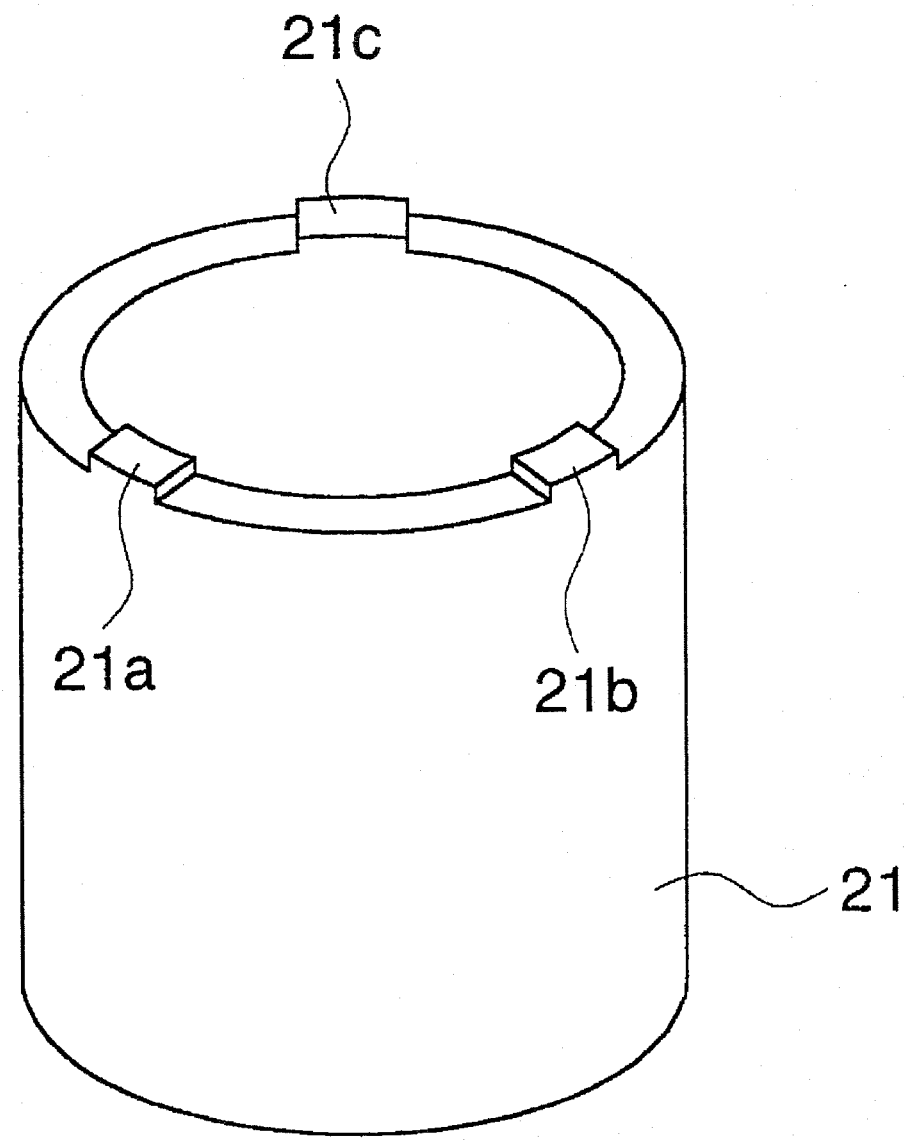
FIG. 8 is a perspective view of the cylindrical member in the holding construction.

More specific construction is as follows: When the maximum of error of parallelism between the ridge of the rectangular prism 11 and the surface opposed to this ridge is $d\theta_{max}$, a cylindrical member 21 is used in which both bottom surfaces form an angle of $nd\theta_{max}$. In this case, the bottom surface of the cylindrical member 21 is not limited to the ring-shaped end surface of the cylindrical member 21, but it includes a surface formed by ends of the protrusions provided on the ring-shaped end surface, wherein the number of the protrusions is not less than 3. The degree of inclination may be about 1.5 minutes as described later. In the case where the cylindrical member 21, the diameter of which is 60 mm, has three protrusions 21a to 21c arranged at regular intervals as illustrated in FIG. 8, a predetermined inclination can be provided when the height of the protrusion is 20 µm.

Also, a ring-shaped member 22 having an opening at a center of a plane is applied.

A surface opposed to the rectangular ridge of the rectangular prism 11 is made to coincide with the plane of the ring-shaped member 22 so as to be fixed.

The plane of the ring-shaped member 22 is made to coincide with one of the bottom surfaces of the cylindrical member 21 so as to be fixed.

The other bottom surface of the cylindrical member 21 is fixed to a mount surface 23 of the motor 13.

A position in the rotational direction at which the cylindrical member 21 and the motor 13 are fixed is made to be variable, and also a position in the rotational direction at which the cylindrical member 21 and the ring-shaped member 22 are fixed is made to be variable.

Next, the mode and effect of the operation will be explained as follows.

When the rectangular prism 11 is rotated by 180°, directions of the reflecting beams coincide with each other. When the rectangular prism 11 is rotated by one revolution (360°), the reflecting beam is rotated by two revolutions. However, when the rectangular prism 11 is rotated by 180° and a dislocation is caused in the direction of the reflecting beam, a circle drawn by the first revolution and that drawn by the second revolution are shifted.

When each component is maintained in accordance with the aforementioned essential construction, the first and second circles coincide with each other. When a light beam deflecting element is used which is synchronously rotated by two revolutions with respect to the rectangular prism 11 rotated by one revolution, and when a dislocation is caused as described, the light beam direction of the first revolution is shifted from that of the second revolution. However, when the components are attached in accordance with the essential construction described above, the shift of the light beam can be prevented.

According to the above specific construction, angle adjustment can be carried out by one inclined cylindrical member 21.

The present invention utilizes the following phenomenon: The angular error in the rotational direction in which the rectangular ridge of the rectangular prism 11 is used as a rotational axis, seldom affects the light beam reflecting direction.

By way of an example, a value of the parallelism error caused between the ridge of the rectangular prism 11 and the surface opposed to it is about one minute. The refractive index of optical glass is about 1.5. The inclination angle of the cylindrical member 21 is about 1.5 minutes (90 seconds).

In general, with respect to the right angle accuracy between the attaching surface 23 of the motor 13 and the rotational axis, it is easy to provide a high accuracy, and it is possible to provide an accuracy of 10 and several seconds, which is competently small.

When a position in the rotational direction is selected in the case where the cylindrical member 21 is fixed onto the attaching surface 23 of the motor 13, for example, when the maximum inclination direction is made to be perpendicular to each other, a surface of the cylindrical member 21 on the opposite side can be inclined by $nd\theta_{max}$ or more with respect to the rotational axis of the motor 13.

Consequently, when an angle is selected in which the ring-shaped member 22 to which the rectangular prism 11 attached, is fixed to the cylindrical member 21, the rectangular prism 11 can be held being inclined by a minute angle in the manner of the essential construction described above.

Figure 9:
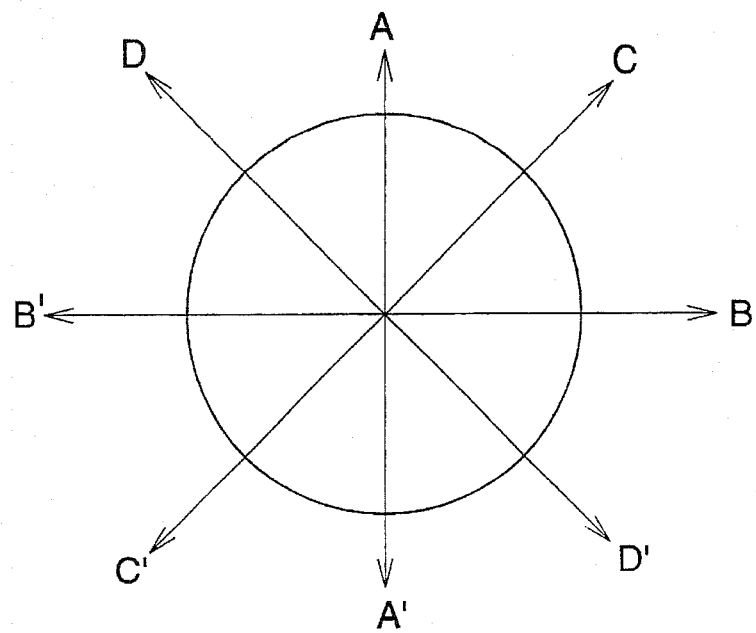
FIGS. 9(a), 9(b) and 9(c) are schematic illustration for explaining the holding.
Figure 9:
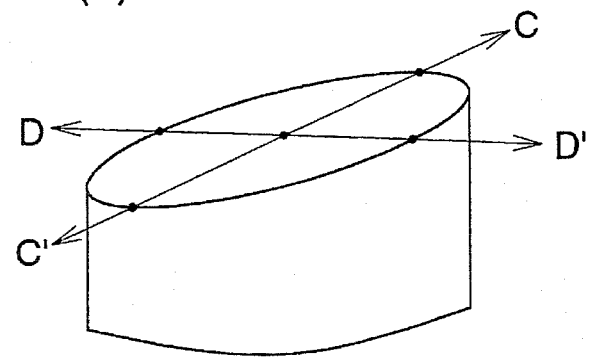
Figure 9:
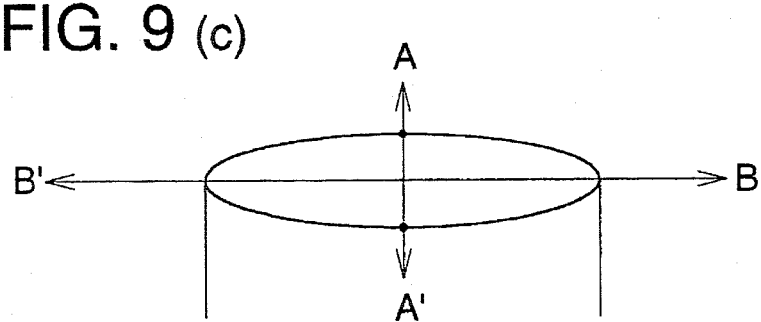

With reference to FIG. 9, explanations are described as follows.

A–A' is a direction of the maximum inclination in the case where an error is caused in such a manner that the attaching surface 23 of the motor 13 does not make a correctly right angle with the rotational axis.

B–B' is perpendicular to A–A'. The maximum inclination of both bottom surfaces of the cylindrical member 21 is set in the direction of B–B'. The attaching surface 23 of the motor 13 is not inclined in this direction with respect to the rotational axis. Therefore, a surface on the opposite side of the cylindrical member 21 (a surface onto which the ring-shaped member 22 is attached) is inclined by $nd\theta_{max}$ with respect to the rotational axis.

C–C' is determined in the following manner. When the cylindrical member 21 is attached in the above manner, a direction of the maximum inclination of the surface to which the ring-shaped member 22 is attached with respect to a surface perpendicular to the rotational axis, is located between A–A' and B–B', and this direction is defined as C–C'.

D–D' is perpendicular to C–C'. In this direction, the surface onto which the ring-shaped member 22 is attached becomes perpendicular to the rotational axis.

In this case, in a range from B–B' to D–D', the inclination is changed from $nd\theta_{max}$ to 0.

When a direction of the ridge of the rectangular prism 11, the parallelism error of which is $d\theta$, is adjusted in a range between B–B' and C–C', the angle can be set at the value described in the essential construction.

In this case, an inclination is left,m the rotational axis of which is a ridge direction of the rectangular prism 11. This inclination seldom affects the light beam reflecting direction, so that no practical problems are caused.

In a range between C–C' and B–B', the inclination is increased larger than $nd\theta_{max}$, so that this range is not put into practical use. However, since the rectangular error of the attaching surface of the motor 13 is smaller than the parallelism error of the rectangular prism 11, the inclination between C–C' and B–B' is sufficiently smaller than that between B–B' and D–D'.

As described above, according to the present invention, a dislocation of the light beam caused by the insufficient holding accuracy of the image rotation optical means, the period of which is a period of time in which the primary scanning operation of conducted twice, can be suppressed, or its influence can be alleviated. Therefore, an image of high quality can be provided.

When a beam splitter is used, a reflection type image rotation optical means can be applied. In this case, the power fluctuation caused when a light beam passes through the beam splitter after it has passed through the image rotation optical means can be compensated by the polarization compensating means.

What is claimed is:

1. An apparatus for recording an image on a photosensitive material by scanning with a light beam having image information of said image, comprising:

a cylinder for holding said photosensitive material, wherein said photosensitive material faces an interior of said cylinder and is adapted to be scanned in a circumferential direction thereof;

means for projecting said light beam;

first optical means for transmitting said light beam projected from said projecting means in a direction substantially parallel to a central axis of said cylinder;

means for rotating said first optical means about said central axis, wherein said first optical means rotates said light beam projected from said projecting means about a rotating axis of said first optical means at a rotating speed twice said rotating speed of said first optical means;

second optical means for transmitting said light beam rotated by said first optical means and magnifying said light beam so as to expand a diameter of said light beam;

third optical means for transmitting said light beam magnified by said second optical means and changing a direction of said light beam to a direction which is substantially perpendicular to said central axis so as to direct said light beam onto said photosensitive material; and means for rotating said third optical means about said central axis synchronized with a rotation of said light beam rotated by said first optical means whereby said image is recorded on said photosensitive material by scanning with said light beam transmitted from said third optical means.

2. The apparatus of claim 1, wherein said first optical means includes:

an image rotation optical element for reflecting said light beam; and a beam splitter for reflecting said light beam projected from said projecting means to said image rotation optical element, and said beam splitter for transmitting said light beam reflected from said image rotation optical element to said second optical means.

3. The apparatus of claim 1, further comprising:

a polarization compensation means for compensating a difference of splitting characteristics between P-polarization and S-polarization, wherein said polarization compensation means transmits said light beam rotated by said first optical means.

4. The apparatus of claim 1, wherein a phase relation between said first optical means and said third optical means is configured that a deviation of said first optical means is parallel with a scanning direction of said light beam, transmitted from said third optical means, when said third optical means deflects said light beam at a center of an effective scanning region, and said deviation of said first optical means is perpendicular to said scanning direction of said light beam, transmitted from said third optical means, when said third optical means deflects said light beam at a center of an ineffective scanning region.

5. The apparatus of claim 1, further comprising:

a control means for controlling said projecting means so that said light beam is stopped for one rotation at every two rotations of said third optical means.

\* \* \* \* \*